Patented June 9, 1953

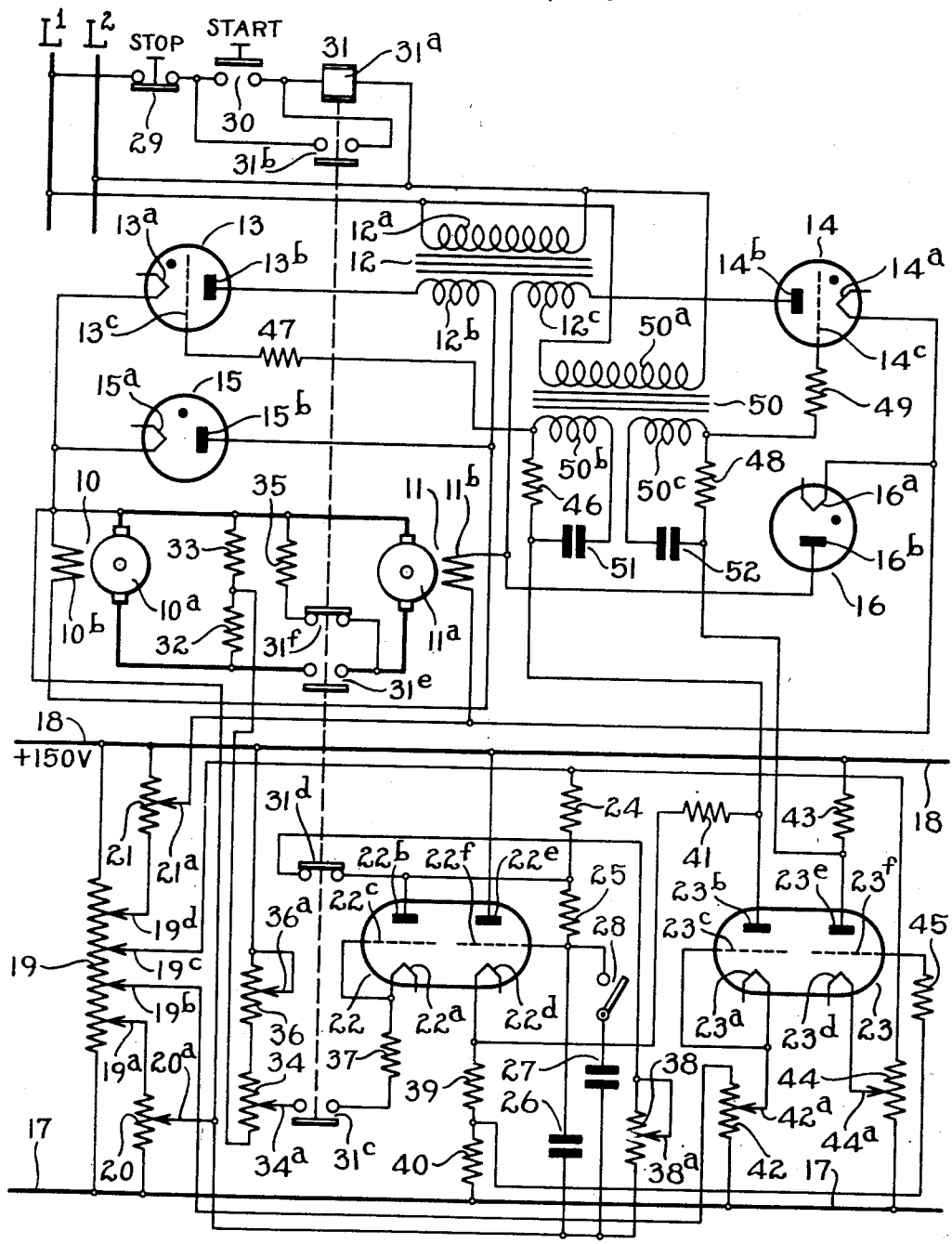

2,641,735

UNITED STATES PATENT OFFICE 2,641,735

ELECTRONIC MOTOR CONTROL SYSTEM

William H. Elliot, Whitefish Bay, Wis., assignor to Cutler-Hammer, Inc., Milwaukee, Wis., a corporation of Delaware Application December 12, 1949, Serial No. 132,493

8 Claims. (Cl. 318—141)

This invention relates to an electronic motor control system, which while not limited thereto, is particularly suitable for controlling the speed of a direct current motor in an adjustable-voltage drive system.

The use of adjustable-voltage motor drives, where it is necessary to operate at various speeds throughout a very wide range, has become increasingly popular. In such a drive system, variation in speed of the motor from its base speed is obtained by adjustment of the voltage of the generator field, the strength of which determines the motor armature voltage, and by adjustment of the voltage of the motor field. Sub-basic motor speeds are customarily obtained by reducing the generator field strength while maintaining the motor field at full strength, and speeds above basic motor speed are customarily obtained by reducing the motor field strength while maintaining the generator field at full strength. In order to control the strength of the generator and motor fields, a source of adjustable direct voltage is required.

Rectification of alternating current power through the use of grid controlled gaseous electron tubes has proved to be a very satisfactory way of providing adjustable voltage direct current power for the generator and motor fields. Control of the field strengths may be readily obtained by initiating the conduction of such electron tubes at appropriate moments during the positive half cycles of the supplied power. Such control may be of a manually phase-shifted type, wherein proper acceleration and deceleration are directly dependent on operator judgment, or of a semi-automatic type whereby the operator may start, stop, preset or change the speed of the motor, the rate of change of speed being determined solely by the controller. The present invention deals with controllers of the latter type.

In accelerating a motor and its connected load from rest to some preset speed above base speed under this system, it is desirable that the motor start with full field strength and that its armature voltage be increased smoothly at some optimum rate until full armature voltage is reached, whereupon the field strength of the motor may be weakened gradually until the preset speed is obtained. Should the operator, desiring a different speed, rotate the speed setting knob abruptly, it is furthermore desirable that the change in speeds take place at a predetermined maximum rate rather than abruptly.

Other circuits have heretofore been designed to provide these desired operating characteristics in full or in part, but the control system herein disclosed provides these features with a novel simplicity and a minimum of components.

An object of the invention is to provide an improved and simplified controller for adjustable-voltage drives which rectifies alternating current to provide a separate adjustable voltage supply for both the generator field and the motor field.

Another object of the invention is to provide a controller of the aforementioned character which permits adjustment of both the minimum and maximum voltages of both the generator and motor fields and the value of the increasing generator field voltage at which the motor field begins to weaken.

Another object of the invention is to provide a controller of the aforementioned character which allows presetting the speed of an adjustable-voltage drive and limits the rate of acceleration to and deceleration from that speed to a predetermined value.

Another object of the invention is to provide a controller of the aforementioned character which limits the rates of change of field strength to a maximum rate which is independent of the rate of change of the speed setting mechanism.

Another object of the invention is to provide a controller of the aforementioned character which is relatively simple with respect to circuit components and circuit arrangement and is economical to build and reliable in operation.

Other objects and advantages of the invention will hereinafter appear.

For a better understanding of this invention, reference may be made to the accompanying drawing, wherein the single figure schematically and diagrammatically illustrates my improved control system.

In the drawing, a direct current generator 10 having an armature 10$^a$ and field 10$^b$ is employed to supply power to a direct current motor 11 having an armature 11$^a$ and a field 11$^b$. The current in field 10$^b$ determines the voltage supplied to armature 11$^a$ of motor 11 and is adjusted to various values for operation of the motor 11 at sub-basic speeds with full motor field strength, whereas the current in field 11$^b$ may be adjusted to less than rated value for operation of the motor 11 at speeds above basic speed with full armature voltage.

A single-phase transformer 12 having a primary winding 12$^a$ connected to a-c supply lines L$^1$ and L$^2$ has one secondary winding 12$^b$ and another secondary winding 12c. Secondary winding 12b supplies power through a gaseous, grid controlled electron tube 13 having a cathode 13a, an anode 13b, and a control grid 13c, to the generator field winding 10b. Secondary winding 12c supplies power through a gaseous, grid controlled electron tube 14, having a cathode 14a, an anode 14b, and a control grid 14c, to the motor field winding 11b. A gaseous rectifier tube 15, having a cathode 15a and an anode 15b, is connected across the generator field 10b, and a similar tube 16, having a cathode 16a and anode 16b, is connected across motor field 11b, to provide for each field a circuit of the well known back-rectifier or "free-wheeling" type.

Power for the electronic control circuits for this system is derived from a regulated direct voltage source through buses 17 and 18, the latter probably being about 150 volts positive with respect to the former. A voltage divider 19 is connected across these buses to provide intermediate voltages at its adjustable taps 19a, 19b, 19c, and 19d. A potential divider rheostat 20 having an adjustable contact 20a is connected between tap 19a of voltage divider 19 and bus 17 to afford a further subdivision of voltage between tap 19a and bus 17. A potential divider rheostat 21 having an adjustable contact 21a is connected between tap 19d of voltage divider 19 and bus 18 to afford a further subdivision of voltage between tap 19d and bus 18.

The twin-triode tubes 22 and 23 are employed for controlling the grid voltages of the gaseous tubes 13 and 14. Tube 22 has a first triode having a cathode 22a, an anode 22b, and a control grid 22c, and a second triode having a cathode 22d, an anode 22e, and a control grid 22f. Likewise, tube 23 has a first triode having a cathode 23a, an anode 23b, and a control grid 23c, and a second triode having a cathode 23d, an anode 23e, and a control grid 23f.

Rates of change of currents in the generator field 10b and motor field 11b are determined basically by the resistor-capacitor timing circuit including resistors 24 and 25 and capacitor 26 connected in a series between adjustable taps 19c and 20a. Another capacitor 27 may be connected in parallel with capacitor 26 by closing switch 28.

Starting and stopping of the control system is afforded through the medium of a stop button 29, a start button 30, and an operating coil 31a of an electromagnetic relay 31 connected in series relationship across lines L1 and L2. Relay 31 is provided with normally open contacts 31b, 31c, and 31e, and normally closed contacts 31d and 31f. Contacts 31f are connected in series with a dynamic braking resistor 35 across the motor armature 11a.

In order to provide a feed back voltage for stabilization purposes, a voltage divider consisting of resistors 32 and 33 is connected across generator armature 10a. From the common connection between these resistors, a connection is made to one end of a potential divider rheostat 34, having a movable contact 34a. The other end of rheostat 34 is connected to one end of a rheostat 36, which has a movable contact 36a connected to one of its ends to short out more or less of its resistance. The other end of rheostat 36 is connected to bus 18.

The cathode 22a and control grid 22c of tube 22 are connected to each other and have connection through a resistor 37 to one of the stationary contacts 31c, the other of which contacts are connected to movable contact 34a of rheostat 34.

A rheostat 38, having a movable contact 38a connected to one of its ends for shorting out more or less of its resistance, is connected at one end through normally closed contact 31d to the common connection between resistors 24 and 25 and is connected at its other end to adjustable contact 20a, which contact also has connection with the negative plates of capacitors 26 and 27. With contacts 31d closed, the capacitors are thereby afforded a discharge path through resistor 25 and rheostat 38.

The anode 22b of tube 22 is also connected to the common connection between resistors 24 and 25, so that with contacts 31c closed, the rise in potential of the common connection point of resistors 24 and 25 is limited to approximately the potential of terminal 34a of rheostat 34 through the rectifying action of diode connected elements 22a, 22b, and 22c of tube 22.

The anode 22e of tube 22 is connected directly to bus 18, the cathode 22d is connected through cathode resistors 39 and 40 to bus 17, and the control grid 22f is connected to the common connection between resistor 25 and capacitor 26.

The anode 23b of tube 23 is connected through a resistor 41 to cathode 22d of tube 22. Cathode 23a and control grid 23c are jointly connected to movable contact 42a of a potential divider rheostat 42 which is connected between bus 17 and movable contact 19b of voltage divider 19.

The anode 23e of tube 23 is connected through a resistor 43 to bus 18. Cathode 23d is connected to movable contact 44a of a potential divider rheostat 44 which is connected between bus 17 and contact 19c of voltage divider 19. Control grid 23f is connected through a resistor 45 to the common connection between resistors 39 and 40.

The anode 23b of tube 23 is further connected through resistors 46 and 47 to control grid 13c of tube 13 and anode 23e is further connected through resistors 48 and 49 to control grid 14c of tube 14.

A transformer 50 having a primary winding 50a connected across supply lines L1 and L2 has secondary windings 50b and 50c. Winding 50b is connected across resistor 46 in series with a capacitor 51. Winding 50c is connected across resistor 48 in series with capacitor 52.

The operation of the control system will now be described:

Energization of buses 17 and 18 with a regulated direct voltage supplies power to all circuits connected between any of the taps 19a, 19b, 19c, and 19d of voltage divider 19 or between any of those taps and either of said buses. Energization of lines L1 and L2 supplies power to the primaries of transformers 12 and 50. Although omitted in the drawing for the sake of simplicity, all tube filament supplies are presumably energized and the tubes in operating condition before the start button is operated.

The current which tubes 13 and 14 will conduct is determined by the bias voltage on their respective control grids 13c and 14c. This bias voltage consists of a direct current component and a superimposed alternating current component. The magnitude and polarity of the former is governed by the control circuit whose functioning is now to be described, whereas the magnitude and phase of the latter is constant and is determined by the phase shift circuits comprising secondary winding 50b, capacitor 51 and resistor 46 for tube 13, and secondary winding 50c, capacitor 52, and resistor 48 for tube 14. Each of these phase shift circuits provide an A.-C. component which is retarded in phase about 90 degrees with respect to the anode voltage applied to the respective gaseous tubes 13 and 14. By adjustment of the D.-C. bias the point of discharge of these tubes may be changed steplessly from a condition allowing no conduction to one allowing full conduction during the positive half cycles of anode voltage of tubes 13 and 14.

The circuit in which the D.-C. component of grid bias for tube 13 is created may be traced as follows: cathode $13^a$ of tube 13, through adjustable contact $20^a$ of potential divider 20, through the lower section of potential divider 20 to bus 17, from bus 17 through resistors 40, 39, 41, 46, and 47 to grid $13^c$ of tube 13. The potential drop from $20^a$ to bus 17 provides a negative bias which reduces the current flow through tube 13, and hence the generator field strength, to zero or some small preselected value in the at rest condition. Opposing this bias is the potential drop across resistors 40 and 39 which is a function of the current through the triode consisting of cathode $22^d$, anode $22^e$, and control grid $22^f$ of tube 22. No appreciable voltage drop exists across resistor 41 unless the potential of cathode $22^d$ of tube 22 approaches or exceeds the potential of cathode $23^a$ of tube 23. In this event a current tends to flow through the triode consisting of cathode $23^a$, anode $23^b$, and control grid $23^c$ of tube 23, which creates a potential drop through resistor 41 which in effect limits the rise of the D.-C. bias on control grid $13^c$ of tube 13 to a value determined by the potential of cathode $23^a$ of tube 23.

The triode consisting of cathode $22^d$, anode $22^e$, and control grid $22^f$ of tube 22 together with resistors 39 and 40 form a cathode follower circuit, wherein cathode $22^d$ tends to assume approximately the potential of the control grid $22^f$. The potential of the grid $22^f$ is determined by the potential to which capacitor 26 is charged. Capacitor 26 is charged through resistors 24 and 25 by the potential existing between adjustable contact $19^c$ of voltage divider 19 and adjustable contact $20^a$ of potential divider rheostat 20. At rest capacitor 26 is shunted by resistor 25 and rheostat 38 through normally closed contacts $31^d$ so that capacitor 26 assumes a potential difference between its plates equal approximately to the potential drop existing across rheostat 38 in series with resistor 24. This drop is normally small, so that at rest the voltage across resistors 39 and 40 opposing the negative bias created across part of potential divider 20 also is small. Thus the tube 13 is biased to cut off or only partial conduction, so that the field $10^b$ of the generator 10 is weakened, and consequently the voltage of armature $10^a$ is low.

The circuit in which the D.-C. component of grid bias for tube 14 is created may be traced as follows: cathode $14^a$ of tube 14, through movable contact $21^a$ of potential divider 21, the upper part of potential divider 21, to bus 18, from bus 18 through resistors 43, 48 and 49 to control grid $14^c$ of tube 14. The potential drop through the upper portion of potential divider 21 applies a positive bias which tends to make tube 14 fully conducting or conducting to an extent dependent upon the magnitude of this bias. At rest, the triode consisting of cathode $23^d$, anode $23^e$, and control grid $23^f$ of tube 23 is biased to cutoff so that no appreciable potential drop exists across resistor 43. Tube 14 then is more or less fully conducting and the field $11^b$ of motor 11 is fully energized.

Upon closure of the start button 30, coil $31^a$ of relay 31 becomes energized causing normally open contacts $31^b$, $31^c$, and $31^e$ to close, and normally closed contacts $31^d$ and $31^f$ to open. Closure of contacts $31^b$ maintains the energization of the coil after the start button is released. Closure of contacts $31^e$ completes the circuit consisting of the generator and motor armatures causing the motor to start with low armature voltage and opening of contact $31^d$ allows capacitor 26 (and capacitor 27, if switch 28 is closed) to charge at a rate determined by the time constant of the charging circuit. In so charging, the capacitor, or capacitors, causes the control grid $22^f$ of tube 22 to rise in potential with the cathode $22^d$ following. As a result, the negative D.-C. bias between control grid $13^c$ and cathode $13^a$ of tube 13 is reduced. Consequently, more current flows through tube 13 resulting in increase in the generator voltage which causes motor 11 to accelerate in speed.

Assuming that speed setting potential divider 34 has been adjusted to provide a motor speed in the sub-basic speed range, when capacitor 26 has charged so that the common connection point between resistors 24 and 25 has reached a potential comparable to that of adjustable contact $34^a$ of divider 34, the diode connected triode consisting of cathode $22^a$, anode $22^b$, and control grid $22^c$ of tube 22 becomes conducting so that current is drawn through resistor 24 creating a potential drop which limits further charging of capacitor 26, further rise in the D.-C. component of grid bias of tube 13, further increase in generator armature voltage, and hence further acceleration of the motor. Motor 11 thereafter continues to operate at this preset speed.

Under these conditions the rise in the potential of the cathode $22^d$ of tube 22, and hence anode $23^b$ of tube 23, has been insufficient to exceed the potential of the cathode $23^a$. As a result no appreciable current flows between anode $23^b$ and cathode $23^a$ of tube 23 to exert a limiting effect on the aforementioned potential on control grid $13^c$ of tube 13. Furthermore, the rise of potential of the common connection point between resistors 39 and 40 has been insufficient to raise the potential of control grid $23^f$ of tube 23 high enough to cause current flow between anode $23^e$ and cathode $23^d$ of the latter tube to create a potential drop across resistor 43. Therefore, tube 14 remains more or less fully conducting and the motor field $11^b$ retains full strength.

If, however, the movable contact $34^a$ of potential divider 34 has been adjusted to provide a speed in the field weakened range of the motor, the capacitor, or capacitors, charge as described above, but the rise of the potential of anode $23^b$ of tube 23, and hence control grid $13^c$ of tube 13, is limited by the drop through resistor 41 to a potential which insures the provision of a maximum value of field strength for generator 10, which value is determined by the setting of movable contact $42^a$, determines the armature voltage of motor 11.

Such limiting does not stop the charging of the capacitor, or capacitors, however. At some preset potential of the common connection point between resistors 39 and 40, determined by the adjustment of adjustable contact $44^a$, current starts to flow between anode $23^e$ and cathode $23^d$ of tube 23 creating a potential drop across resistor 43 which causes the potential on grid $14^c$ of tube 14 to fall at a timed rate, thereby reducing the current flow through tube 14 and hence weakening the motor field 11b. This weakening of motor field 11b stops when the potential of anode 22b of tube 22 approaches or exceeds the potential of the adjustable contact 34a of potential divider 34, and motor 11 thereafter operates at this preset speed.

It will be observed that the described accelerations of the motor 11 take place at a rate determined by the time constant of the capacitor charging circuit. It should be pointed out that maximum acceleration occurs over a range of voltages relatively low with respect to the charging voltage, i. e., in the linear region of the exponential charging curve, with the result that the rate of acceleration is reasonably uniform.

Upon operation of the stop button 29, the relay coil 31a becomes deenergized, contacts 31e open the generator-motor armature loop, and contacts 31f close the dynamic braking circuit through resistor 35 causing the motor to come to rest. Contacts 31d complete a discharge path for capacitor 26, or capacitors 26 and 27 in parallel, through resistor 25 and rheostat 38 causing the capacitor, or capacitors, to discharge at a rate determined by the time constant of this circuit. Thus the field 11b of motor 11 returns to full strength and the armature voltage of generator 10 decreases to the present minimum.

The function of rheostat 36 is to so adjust the potential of the top end of potential divider 34 that the maximum rise of the capacitor voltage is held to a value which limits the maximum weakening of the motor field and hence the maximum speed of the motor to predetermined values.

In order to provide a stabilizing effect on the control system during running operation, a part of the generator armature voltage is introduced into the control system in a negative feed-back relationship. As aforeindicated, the lower end of potential divider 34 is connected to the common connection point between resistors 32 and 33 for this purpose. The effect obtained is that as the voltage across the generator, and hence across resistor 33, rises the lower end of potential divider 34 is lowered in potential with respect to cathode 13a of tube 13. This lowering tends to pull the cathode 22a of tube 22, and hence the potential of control grid 13c of tube 13, downward, thus tending to reduce the generator armature voltage. A drop in generator armature voltage consequently tends to increase the flow of current through tube 13 to partially counteract the generator armature voltage drop. This negative feed-back relationship is effective in minimizing speed regulation as a result of load changes.

The lower plates of capacitors 26 and 27, and the lower end of rheostat 38, are connected to adjustable contact 20a of potential divider 20 rather than to bus 17 so that upon pressing the start button the increase in generator armature voltage takes place smoothly from the predetermined minimum generator armature voltage value without delay or discontinuity. Inasmuch as the setting of adjustable contact 20a of potential divider 20 is adjusted in accordance with the minimum generator voltage desired, if the lower plates of capacitors 26 and 27 were connected to bus 17, a period of time would elapse in charging said capacitors to a value corresponding to the potential of adjustable contact 20a above bus 17 before an increase in generator voltage would be initiated. This delay is avoided by the connection indicated.

While operating at a given speed as determined by the setting of movable contact 34a of potential divider 34, the operator may move this contact abruptly to call for a higher speed. It is a feature of this control system that motor 11 will accelerate to its new speed at a predetermined rate which is a function of the time constant of resistors 24 and 25 in series with capacitor 26, or capacitors 26 and 27 in parallel. Likewise, should the operator adjust movable contact 34a of potential divider 34 abruptly for a lower speed setting, motor 11 will decelerate gradually at a rate determined by the time required for the capacitor 26, or capacitors 26 and 27, to discharge through resistor 25, anode 22b and cathode 22a of tube 22, resistor 37, the lower part of potential divider 34, and resistor 33.

Several modifications or variations of the control system hereinbefore described to meet specific applications will suggest themselves to those skilled in the art. One such modification would be the addition of one or more potential divider rheostats in parallel with rheostat 34 with appropriate relay circuits to provide additional preset operating speeds.

By way of recapitulation, minimum or starting generator armature voltage is determined by the adjustment of adjustable contact 20a of potential divider 20, maximum generator armature voltage is determined by the adjustment of movable contact 42a of potential divider 42, maximum motor field voltage is determined by the adjustment of movable contact 21a of potential divider 21, minimum motor field voltage is determined by the adjustment of movable contact 36a of rheostat 36, and the moment at which the motor field starts to weaken as the motor armature voltage rises to full strength, or thereafter, is determined by the adjustment of movable contact 44a of potential divider 44. The rate of motor acceleration is determined mainly by the time constant of resistors 24 and 25 in series with capacitor 26, or capacitor 26 with capacitor 27 in parallel. The rate of motor deceleration upon movement of the speed setting contact 34a downward abruptly is determined largely by the time constant of resistors 25 and 37 in series with capacitor 26 alone, or in series with both capacitors 26 and 27 in parallel. The rate of deceleration of the motor on operating the stop button is a function of the inertia of the load and the value of the dynamic braking resistor 35.

A control system is thus provided which permits presetting of motor speeds, automatically controlling the acceleration to and deceleration from a selected preset speed, and controlling the change of speed from one selected value to another at a fixed rate with a minimum of circuit simplicity consistent with speed stability and with independence of the motor operating characteristics.

I claim:

1. The combination with an electron tube connected to an alternating current supply source and having a control electrode for regulation of its rectified output, of means for subjecting said control electrode to an alternating potential out of phase with the anode potential of said tube, a constant voltage source, a capacitor, means including a resistor connected in circuit with said capacitor constantly acting to charge the latter with a current derived from said constant voltage source, a normally active discharge path for said capacitor, means operable to interrupt said discharge path, means in circuit with said capacitor and acting when said discharge path is interrupted to limit the maximum potential to which said capacitor is charged, and means in circuit with said constant voltage source and supplying said control electrode with a unidirectional potential varying in magnitude with the potential of said capacitor.

2. The combination with an electron tube connected to an alternating current supply source and having a control electrode for regulation of its rectified output, of means for subjecting said control electrode to an alternating potential out of phase with the anode potential of said tube, a constant voltage source, a capacitor, means including a resistor connected in circuit with said capacitor constantly acting to charge the latter with a current derived from said constant voltage source, a normally active discharge path for said capacitor, means operable to interrupt said discharge path, means including an adjustable element in circuit with said constant voltage source affording a constant but adjustable reference voltage, means in circuit with said element and said capacitor acting when said discharge path is interrupted to limit the maximum potential to which said capacitor is charged to said reference voltage, and means in circuit with said constant voltage source and supplying said control electrode with a unidirectional potential varying in magnitude in accordance with the potential of said capacitor.

3. The combination with an electron tube connected to an alternating current supply source and having a control electrode for regulation of its rectified output, of means for subjecting said control electrode to an alternating potential out of phase with the anode potential of said tube, a constant voltage source, a capacitor, means including a resistor connected in circuit with said capacitor constantly acting to charge the latter with a current derived from said constant voltage source, a normally active discharge path for said capacitor, means operable to interrupt said discharge path, means including an adjustable element in circuit with said constant voltage source affording a constant but adjustable reference voltage, means in circuit with said element and said capacitor and acting when said discharge path is interrupted to limit the maximum potential to which said capacitor is charged, and means comprising a resistor and an electron tube having a control electrode subjected to the potential of said capacitor, an anode connected to the high potential side of said constant voltage source and a cathode connected to the low potential side of the latter source in series with the last mentioned resistor, said cathode of the last mentioned tube also having connection with the control electrode of the first mentioned tube, the last mentioned means acting to supply said control electrode of said first mentioned tube with a unidirectional potential varying in magnitude in accordance with the potential of said capacitor.

4. The combination with controllable electron discharge tubes individualized to and controlling the energization of the field windings of a generator and a motor having their armatures connected in a loop circuit, of means individualized to the control electrodes of said tubes for subjecting the same to alternating potentials out of phase with the anode potentials of said tubes, a constant voltage source, a capacitor, means including a resistor in circuit with said capacitor for supplying the latter with charging current derived from said source, a normally active discharge path for said capacitor, means for interrupting said discharge path, means including an adjustable element in circuit with said source affording constant but adjustable reference voltage, means in circuit with said capacitor and said element acting when said discharge path is interrupted to limit the maximum potential to which said capacitor is charged to said reference voltage, means including intermediately tapped resistance means in circuit across said source and having connection with said capacitor and the control electrode of the discharge tube associated with the generator field winding for subjecting such control electrode to a unidirectional potential varying directly with the capacitor potential, means including a second adjustable element in circuit with said source affording a second constant but adjustable reference voltage, means in circuit with the control electrode of said discharge tube associated with the generator field winding and said second adjustable element and acting to limit the maximum value of said unidirectional potential in accordance with a value determined by the adjustment of said second adjustable element, means including a third adjustable element in circuit with said source affording a third constant but adjustable reference voltage, and means in circuit with said source, the control electrode of the discharge tube associated with the motor field winding and the tap of said resistance means normally acting to subject the control electrode of the last mentioned discharge tube to a unidirectional potential affording maximum conduction of the latter tube, said last mentioned means acting when the potential of said tap of said resistance means exceeds a predetermined value to progressively decrease the last mentioned unidirectional potential to a minimum value, as determined by the adjustment of said third adjustable element, inversely with increase in the capacitor potential.

5. The combination with controllable electron discharge tubes individualized to and controlling the energization of the field windings of a generator and a motor having their armatures connected in a loop circuit, of means individualized to the control electrodes of said tubes for subjecting the same to alternating potentials out of phase with the anode potentials of said tubes, a constant voltage source, a capacitor, means including a resistor in circuit with said capacitor for supplying the latter with charging current derived from said source, a normally active discharge path for said capacitor, means for interrupting said discharge path, means including an adjustable element in circuit with said source affording constant but adjustable reference voltage, means in circuit with said capacitor and said element acting when said discharge path is interrupted to limit the maximum potential to which said capacitor is charged to said reference voltage, means comprising intermediately tapped resistance means and a third electron tube having a control electrode subjected to the potential of said capacitor, an anode connected to the high potential side of said source and a cathode connected in series with said resistance means to the low potential side of said source, said third tube also having connection with the discharge tube associated with the generator field winding and subjecting the same to a unidirectional potential varying with the capacitor potential, means including a second adjustable element in circuit with said source affording a second constant but adjustable reference voltage, means in circuit with the control electrode of said discharge tube associated with the generator field winding and said second adjustable reference voltage and acting when the cathode potential of said third tube exceeds a value determined by the adjustment of said second adjustable element to limit the maximum value of said unidirectional potential, means including a third adjustable element in circuit with said source affording a third constant but adjustable reference voltage, and means in circuit with said source, the control electrode of the discharge tube associated with the motor field winding and the tap of said resistance means normally acting to subject the control electrode of the last mentioned discharge tube to a unidirectional potential affording maximum conduction of the latter tube, said last mentioned means acting when the potential of said tap of said resistance means exceeds a predetermined value to progressively decrease the last mentioned unidirectional potential to a minimum value, as determined by the adjustment of said third adjustable element, inversely with increase in the capacitor potential.

6. The combination with controllable electron discharge tubes individualized to and controlling the energization of the field windings of a generator and a motor having their armatures connected in a loop circuit, of means individualized to the control electrodes of said tubes for subjecting the same to alternating potentials out of phase with the anode potentials of said tubes, a constant voltage source, a capacitor, means including a resistor in circuit with said capacitor for supplying the latter with charging current derived from said source, a normally active discharge path for said capacitor, means for interrupting said discharge path, means including an adjustable element in circuit with said source affording constant but adjustable reference voltage, means in circuit with said capacitor and said element acting when said discharge path is interrupted to limit the maximum potential to which said capacitor is charged to said reference voltage, means comprising intermediately tapped resistance means and a third electron tube having a control electrode subjected to the potential of said capacitor, an anode connected to the high potential side of said source and a cathode connected in series with said resistance means to the low potential side of said source, said third tube also having connection with the discharge tube associated with the generator field winding and subjecting the same to a unidirectional potential varying with the capacitor potential, means including a second adjustable element in circuit with said source affording a second constant but adjustable reference voltage, a fourth electron tube having its anode connected to the control electrode of said discharge tube associated with the generator field winding and a cathode connected to said second adjustable element, said fourth tube being rendered conducting to limit the maximum value of said unidirectional potential as determined by the adjustment of said second adjustable element, means including a third adjustable element in circuit with said source affording a third constant but adjustable reference voltage, and means in circuit with said source, the control electrode of the discharge tube associated with the motor field winding and the tap of said resistance means normally acting to subject the control electrode of the last mentioned discharge tube to a unidirectional potential affording maximum conduction of the latter tube, said last mentioned means acting when the potential of said tap of said resistance means exceeds a predetermined value to progressively decrease the last mentioned unidirectional potential to a minimum value, as determined by the adjustment of said third adjustable element, inversely with increase in the capacitor potential.

7. The combination with an electron tube connected to an alternating current supply source and having a control electrode for regulation of its rectified output, of means for subjecting said control electrode to an alternating potential out of phase with the anode potential of said tube, a constant voltage source, a capacitor, means in circuit with the cathode of said tube, the low potential side of said constant voltage source, and said capacitor and including an adjustable element which according to its adjustment is determinative of the minimum potential of said capacitor, means including a resistor connected in circuit with said capacitor constantly acting to charge the latter with a current derived from said constant voltage source, a normally active regulable discharge path for said capacitor, means operable to interrupt said discharge path, means including an adjustable element in circuit with said constant voltage source affording a constant but adjustable reference voltage, means in circuit with said capacitor and the last mentioned adjustable element acting when said discharge path is interrupted to limit the charge of said capacitor to said reference voltage, and means in circuit with said constant voltage source and said control electrode for supplying the latter with a unidirectional potential varying with the magnitude of the potential of said capacitor.

8. The combination with controllable electron discharge tubes individualized to and controlling the energization of the field windings of a generator and a motor having their armatures connected in a loop circuit, of means individualized to the control electrodes of said tubes for subjecting the same to alternating potentials out of phase with the anode potentials of said tubes, a constant voltage source, a capacitor, means including a resistor in circuit with said capacitor for supplying the latter with charging current derived from said source, a normally active discharge path for said capacitor, means for interrupting said discharge path, means including an adjustable element in circuit with said source affording constant but adjustable reference voltage, means in circuit with said capacitor and said element acting when said discharge path is interrupted to limit the maximum potential to which said capacitor is charged to said reference voltage, means comprising intermediately tapped resistance means and a third electron tube having a control electrode subjected to the potential of said capacitor, an anode connected to the high potential side of said source and a cathode connected in series with said resistance means to the low potential side of said source, said third tube also having connection with the discharge tube associated with the generator field winding and subjecting the same to a unidirectional potential varying with the capacitor potential, means including a second adjustable element in circuit with said source affording a second constant but adjustable reference voltage, a fourth electron tube having its anode connected to the control electrode of said discharge tube associated with the generator field winding and a cathode connected to said second adjustable element, said fourth tube being rendered conducting to limit the maximum value of said unidirectional potential as determined by the adjustment of said second adjustable element, means including a third adjustable element in circuit with said source affording a third constant but adjustable reference voltage, a third resistor, a fifth electron tube having its anode connected to the high potential side of said source in series with said third resistor, its control electrode connected to the tap of said resistance means and its cathode connected to said third adjustable element, means connecting the control electrode of the discharge tube associated with the motor field winding to the point common to said third resistor and said anode of said fifth tube to normally subject such control electrode to a unidirectional potential affording maximum conduction of the last mentioned discharge tube, said fifth tube becoming conducting when the potential of said tap of said resistance means exceeds a predetermined value to progressively decrease the last mentioned unidirectional potential to a minimum value, as determined by the adjustment of said third adjustable element, inversely with increase in the capacitor potential.

WILLIAM H. ELLIOT.

References Cited in the file of this patent

UNITED STATES PATENTS

| Number | Name | Date |
|---|---|---|
| 2,084,206 | La Rogue | June 15, 1937 |
| 2,473,640 | Faulk | June 21, 1949 |
| 2,474,620 | Fath | June 28, 1949 |
| 2,491,413 | Lexa | Dec. 13, 1949 |